July 25, 1967
C. D. TILDEN ET AL
3,332,524
CAR RETARDER APPARATUS
Filed Jan. 8, 1964
3 Sheets-Sheet 1
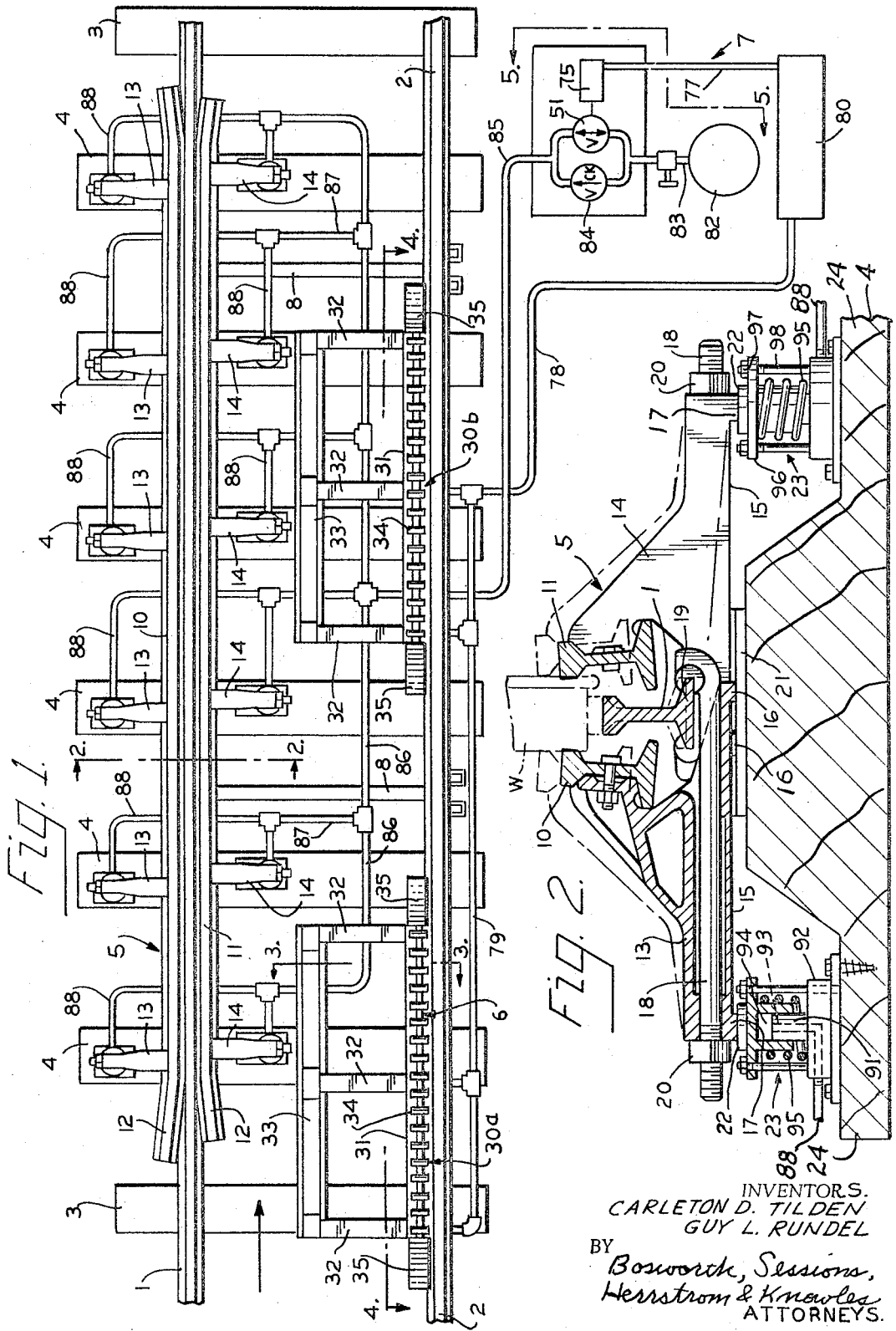
INVENTORS.
CARLETON D. TILDEN
GUY L. RUNDEL
BY
Bosworth, Sessions,
Herrstrom & Knowles
ATTORNEYS.

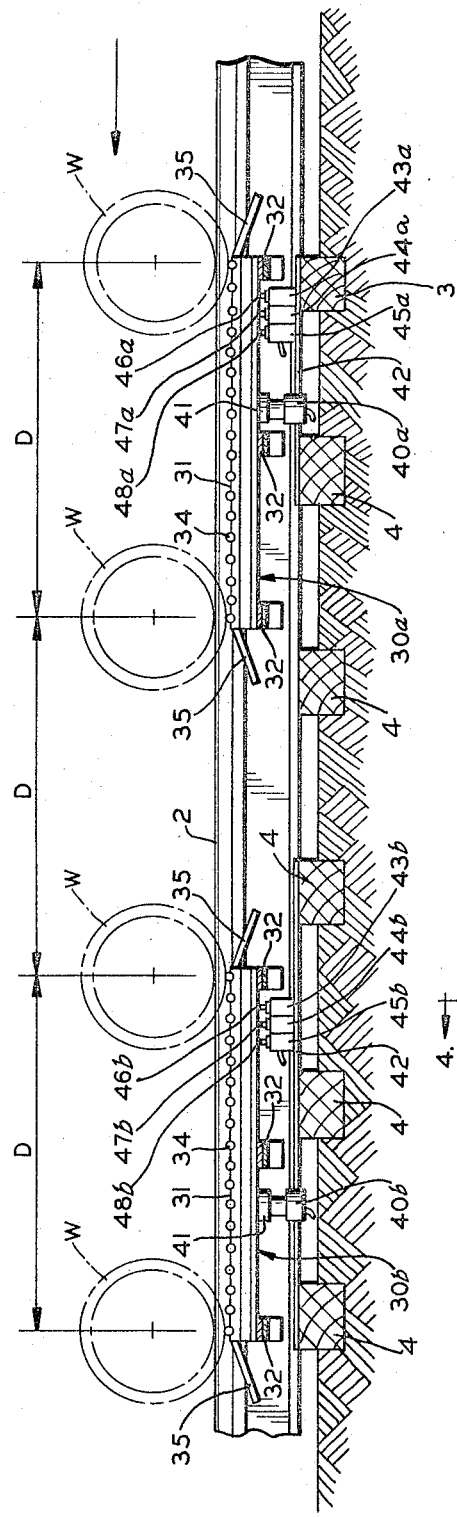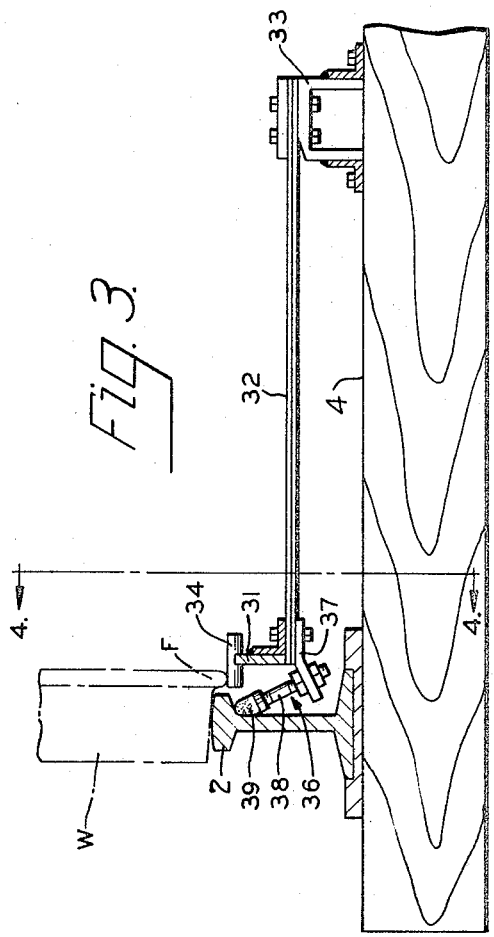

July 25, 1967

C. D. TILDEN ET AL 3,332,524

CAR RETARDER APPARATUS

Filed Jan. 8, 1964

INVENTORS.
CARLETON D. TILDEN
GUY L. RUNDEL
BY Bosworth, Sessions,
Herrstrom & Knowles
ATTORNEYS.

3,332,524
CAR RETARDER APPARATUS
Carleton D. Tilden, Painesville, and Guy L. Rundel, South
Euclid, Ohio, assignors to Cleveland Technical Center,
Inc., Cleveland, Ohio, a corporation of Delaware
Filed Jan. 8, 1964, Ser. No. 336,392
21 Claims. (Cl. 188—180)

This invention relates to speed sensing means, and to speed sensitive car retarders; more particularly it relates to speed sensitive, weight proportional car retarders, and for convenience will be discussed in connection with such retarders.

Inert car retarders of the weight proportional type, in which the braking force exerted on the wheels of a railroad car is essentially proportional to the weight of the car, are widely used. However, since this type of weight proportional car retarder exerts the same braking force on a car of given weight regardless of its speed, a slow-moving car will be stopped and not released if it has insufficient inertia to travel through the car retarder against the resistance caused by the braking force. This characteristic is undesirable in car retarders which are not intended to halt the cars but to control their speed so that they can be released from the retarder at a speed not exceeding a maximum speed.

Car retarders have been proposed which operate in accordance with the weight of the car and the speed of the car but, in general, such prior car retarders require expensive and complicated control systems and often are not as satisfactory or dependable in operation as desired.

An object of the present invention is to provide a speed sensitive, weight proportional car retarder. Another object is the provision of a car retarder in which the braking force acting on the retarded car wheels is proportional to the weight of the car, but is applied to the wheel so long as the car is traveling above a predetermined speed. Another object is the provision of such a car retarder in which the braking force is not applied if the car is traveling below the predetermined speed. A further object is the provision of a car retarder which will become operative if the car is travelling over the predetermined speed, which will then exert on the car a braking force proportional to the weight of the car, and which will release the braking force after the car has been slowed to below the predetermined speed. Another object is the provision of a novel speed sensing means which may be employed in such car retarders, as well as for other purposes. Another object is the provision of apparatuses of the above types which are simple and rugged in construction and dependable in operation, and can be constructed at moderate costs.

These and other objects wil become apparent from the following description of a preferred embodiment of the invention in connection with the following drawings in which:

FIGURE 1 is a plan view of a railroad track incorporating a car retarder embodying the invention;

FIGURE 2 is a section of the braking mechanism along line 2—2 of FIGURE 1;

FIGURE 3 is an elevation of the speed sensing means of the illustrated car retarder, from line 3—3 of FIGURE 1;

FIGURE 4 is an elevation of the speed sensing means viewed from line 4—4 of FIGURE 1 and line 4—4 of FIGURE 3;

Figure 6:
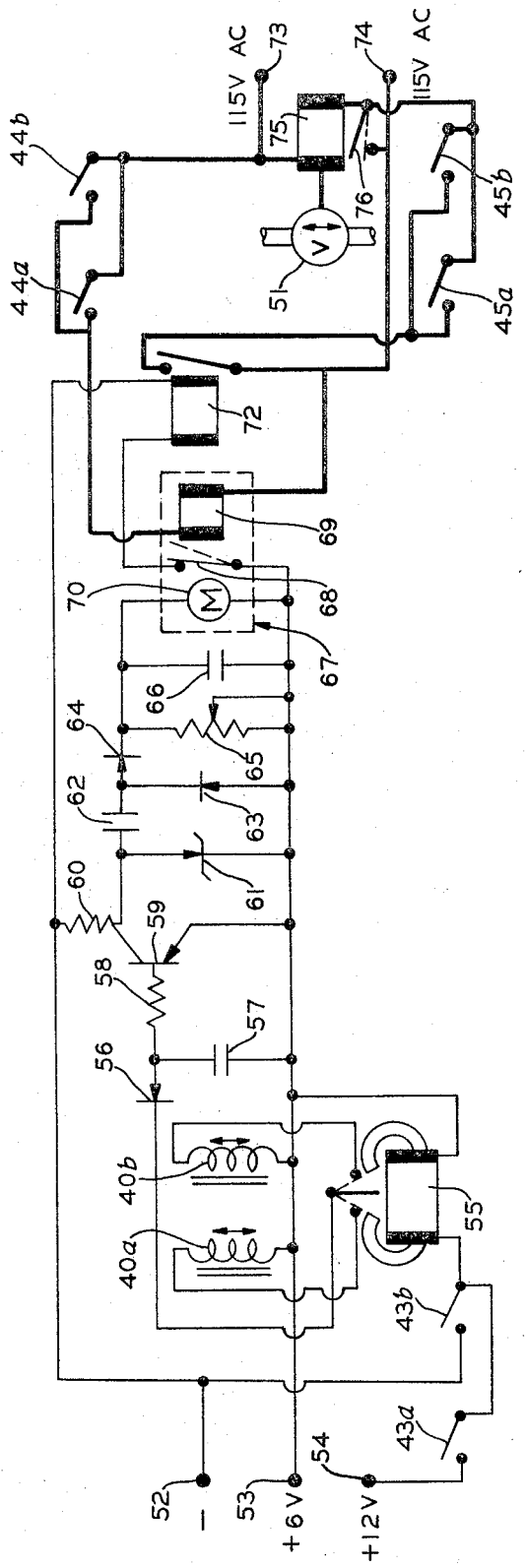
FIGURE 6 is an electrical circuit diagram of the electrical portion of the control means.

The railroad track of FIGURES 1 and 2 comprises two running rails 1 and 2, which outside the retarder are conventionallly fixed to and supported by conventional wood cross ties 3 and inside the retarder are supported by special cross ties 4. Cross ties 3 and 4 are suitably anchored in a conventional manner, as by being set in ballast in the ground. Rail 1 has associated with it a retarder braking mechanism, generally indicated by reference numeral 5, while the other rail 2 has associated with it a speed sensing means 6. This speed sensing means is connected to the braking mechanism 5 through the control means, designated by numeral 7, that control the braking mechanism 5 so it is released if the car speed sensed by the sensing means is lower than a predetermined speed, hereinafter called the "actuating speed." Rails 1 and 2 are connected together by conventional stabilizer means 8 for purposes later indicated.

The braking mechanism comprises brakeshoe rails 10 and 11 positioned on opposite sides of running rail 1 with their upper portions above rail 1. These rails 10 and 11 have outwardly flared ends 12 to facilitate wheel entry. Rail 10 is rigidly fixed to lever members 13 and rail 11 is rigidly fixed to lever members 14. Opposed lever members 13 and 14 are mounted on ties 4 in offset relation as shown in FIGURE 1. Members 13 and 14 are identical; each comprises a lower portion 15 with a downwardly projecting hardened bearing portion 16 at its inner end under running rail 1 and a downwardly projecting hardened bearing portion 17 at its outer end. A hook bolt 18 extends through the lower portion 15 of each member 13 and 14. The inner end of each hook bolt passes under and hooks over the edge of flange 19 of the running rail opposite the side of the rail from which extends a lever member carrying the hook bolt; the outer end of the hook bolt carries a nut 20 bearing against the outer end of the lever member to clamp the hook bolt on the rail 1. The bearing portions 16 of opposed lever members 13 and 14 bear on a plate 21 fixed to a raised intermediate portion of tie 4. Bearing portion 17 of each lever member bears on an individual piston 22 of the cylinder unit 23, to be later described, fixed to one of the lower portions 24 of the tie 4 that is lower than the intermediate portion of the tie to provide room for the cylinder units.

The full lines in FIGURE 2 show the above parts of the braking mechanism when pistons 22 are in their raised positions and no car wheel is between the brakeshoe rails.

The broken lines in FIGURE 2 illustrate the position of these parts when the pistons 22 are raised and prevented from moving downwardly and the wheel W of a moving car is between the brakeshoe rails 10 and 11. The wheel forces the brakeshoe rails 10 and 11 apart, since the space between the unspread brakeshoe rails is narrower than the wheel width. This causes the lever members 13 and 14 to pivot about their outer supporting portions 17 on pistons 22, so that the running rail 1 lifts. The portion of the weight of the car carried by each wheel W between the brakeshoe rails 10 and 11 causes forces to be transmitted from the running rail 1 through the hook bolts 18 to the supporting portions 17 of the levers 13 and 14 carried by pistons 22 and thence to the brakeshoe rails 10 and 11 to cause a braking force to be applied to the car wheels by rails 10 and 11 that is proportional to the weight of the car. Variations normally encountered in the widths of conventional wheels will not appreciably affect the amount of braking force applied, since the width of such a car wheel simply determines the amount that running rail 1 lifts. Stabilizer means 8 prevents the running rail 1 from tipping and maintains the proper gauge of rails 1 and 2.

When the pistons 22 and the cylinder units 23 are permitted to move downwardly, the brakeshoe rails 10 and 11 separate by pivotal movement of the lever members 13 and 14 about their portions 16 bearing on plate 21, so that the braking force exerted by the brakeshoe rails 10 and 11 is lessened or even completely eliminated.

The position of each of the pistons 22 is controlled by the speed sensing means 6 through the agency of control means 7.

The illustrated speed sensing means, as shown in FIGURES 1, 3 and 4, comprises two identical vibratory sensor members 30a and 30b mounted adjacent the inner side of the running rail 2, so that they can be engaged by the flanges of car wheels and caused to vibrate at a frequency proportional to the speed of the car wheel rolling on rail 2. Each of the vibratory members comprises an elongated beam 31 extending along the inner side of the rail and resiliently supported for up-and-down movement by being fixed to the free ends of cantilever spring supporting members 32, the other supported ends of which are fixed to an elongated support 33 mounted on the cross ties. Each beam 31 rigidly carries equally spaced transversely extending protuberances 34 that can be sequentially engaged by the flange of a wheel W rolling on rail 2. The protuberances 34 illustrated take the form of metal teeth formed of wear resistant metal and are rigidly fixed, as by welding, to the top of beam 31 and extend sufficiently closely to rail 2 to be engaged by flange F of wheel W rolling on rail 2. The teeth 34 are so spaced that contact of the flange of the rolling car wheel W with successive teeth 34 causes beam 31 to vibrate generally vertically at a frequency proportional to the speed of travel of the wheel.

Each end of each vibratory beam 31 has a rigid inclined ramp portion 35 so shaped as to be engaged by the flange of each wheel first contacting the beam 31 to move it gradually downward until the first tooth 34 contacts the wheel flange, thus preventing abrupt shocks that could cause undesired vibrations when a wheel first contacts beam 31. Preferably, as shown in FIGURE 3, stop members 36 are fixed to beam 31 at its ends, and also between its ends if desired, to limit upward movement of beam 31 beyond the level where the teeth 34 will be engaged and depressed by the flanges of various wheels rolling on the rail 2. Each stop member 36 comprises a bracket 37 fixed to the bottom of beam 31 and axially adjustably supporting at a suitable angle a threaded stud 38 that has a rail engaging end 39 formed of rubber or similar shock-absorbing material.

Each beam 31 preferably is of such length that its end teeth 34 can be contacted by the wheels of the same car truck as shown in FIGURE 4, and adjacent vibratory beams 31 are spaced apart along the rail 2 by a distance such that the two wheels of the same truck can contact the end teeth of such adjacent vibratory members as is also shown in FIGURE 4, in which the distance D designates the distance between the axes of the axles of a single railroad freight car truck. This insures that when a car travels along the apparatus the wheels of one truck will always be engaged with the teeth of at least one vibratory beam 31.

The first vibratory member 30a contacted by the wheels of a car approaching the car retarder apparatus in the forward direction shown by the arrows in FIGURES 1 and 4 is located so that its teeth 34 are engaged and its beam 31 is vibrated by the wheels of the car before they enter the space between the brakeshoe rails 10 and 11; the lead end of this beam 31 is sufficiently ahead of the lead end of brakeshoe rails 10 and 11 to permit these rails to be controlled by the apparatus when the car enters the retarder at the maximum entering speed for which the retarder is designed. The overall length defined by the beams 31 of the vibratory members 30 preferably is such that it is equivalent to substantially the length of the portion of the running rail 1 between the brakeshoe rails 10 and 11, and desirably is at least equivalent to the major portion of such length of rail 1. Preferably the overall length of the speed sensing portion is great enough in relation to the length of the portion of running rail 1 between the brakeshoe rails so that a wheel entering the retarder at maximum design speed is in contact with the speed sensing means long enough to permit the retarder to slow the wheel to below the actuating speed. Although two vibratory members 30a and 30b are shown in the illustrated embodiment, a different number may be used, preferably arranged in pairs, to attain the desired speed sensing length.

The vibrations of vibratory members 30a and 30b are respectively sensed by vibration transducers 40a and 40b (FIGURE 4) which transform the vibrations into electrical pulses which will be utilized as later described to control the positions of pistons 22 of cylinder units 23. Each of these transducers, both of which preferably are identical, is a commercially available unit. Each transducer is rigidly supported so its vibration-sensing portion 41 contacts a suitable movable portion of one vibratory member 30a or 30b. In the apparatus illustrated each transducer is mounted on an elongated supporting member 42 fixed to the ties adjacent the inner side of the running rail 2 so the upper portion 41 of the transducer contacts the under side of the beam 31 of vibratory member 30a or 30b, so that the transducer can sense the vibrations caused by the rolling wheel and transmit them into electrical pulses of the same frequency as the vibrations. The supporting member 42 below beam 31 of vibratory member 30a also supports three switches 43a, 44a, 45a, and supporting member 42 beneath beam 31 of vibratory member 30b supports three switches, 43b, 44b, 45b. These switches respectively have upwardly biased switch arms 46a, 47a, 48a and 46b, 47b, 48b located so they engage the underside of the associated beam 31 near the end thereof first contacted by the wheel entering the retarder.

The control means 7 as shown comprises electrical circuit means diagrammatically shown in FIGURE 6, that converts electrical pulses issuing from either of the vibration transducers 40a or 40b into a direct current the voltage of which is proportional to the frequency of the pulses and hence proportional to the car speed. This current controls operation of a solenoid controlled valve 51 so that when the current is above a predetermined voltage related to the speed of the car, valve 51 is closed to prevent escape of fluid from cylinders 23 so that pistons 22 are locked in their uppermost positions to hold the brakeshoe rails 10 and 11 in braking position, while when the current voltage is below such predetermined voltage the valve 51 is open to permit escape of fluid from cylinder units 23 so the pistons 22 can depress, as will be described later.

The circuit is connected to a source of electrical power providing six-volt direct current between terminals 52 and 53 and twelve-volt direct current between terminals 52 and 54. Switches 43a, 44a and 45a of vibratory member 30a and switches 43b, 44b and 45b of vibratory member 30b are successively closed by a car wheel rolling through the retarder in the forward direction indicated by the arrows in FIGURES 1 and 4. Each of switches 43a and 43b is connected to a bi-stable polarized relay 55 so that when switch 43a is closed relay 55 is actuated by a current of one polarity to complete a circuit through transducer 40a, and when switch 43b is closed relay 55 is actuated by a current of opposite polarity to complete a circuit through transducer 40b.

The pulses from the transducer in a thus completed circuit are rectified by a diode 56, undesired high frequency currents being shunted by capacitor 57, the resulting pulses, through resistor 58, drive a switching transistor 59 from a normally cut-off state to a full conduction state. This transistor is suitably biased by resistor 60. The amplified pulses from the transistor are shaped to substantially constant amplitude and constant width by a network comprising zener diode 61 and capacitor 62. The resulting pulses of substantially constant amplitude and constant width are then integrated in a network comprising diodes 63 and 64, potentiometer resistor 65, and capacitor 66. The resulting charge on the capacitor 66 controls the operation of a meter relay 67, which may be a commercially available type. This relay includes and controls a switch 68 that is normally closed but can be set open by coil 69 so that it can be controlled by meter 70. Thus, that when the voltage across capacitor 66 drops below the predetermined value mentioned above the switch will be closed, while when the voltage is above the predetermined value the switch will remain open. Closing the switch 68 operates a relay 72 that closes a 115 volt alternating current circuit, energy for which is supplied through terminals 73 and 74. When this circuit is completed, it actuates the solenoid 75 controlling valve 51 to open the valve; when the circuit is incomplete and the solenoid inoperative the valve is biased to the closed position.

In order to prevent the solenoid 75 from opening valve 51 except when a car wheel traveling in the direction of the arrow is actuating the speed sensing means, the switches 45a and 45b are connected in the circuit between the relay 72 and a solenoid 75. Each of these switches is closed by depression of its associated vibratory beam 31 when a car wheel rolls over it, to complete the circuit including the relay 72 and solenoid 75; closure of each switch independently of the other will complete such circuit.

Switches 44a and 44b are provided to connect momentarily the coil 69 of the meter relay 67 to the 115 volt circuit to set the relay so its switch 68 is open, as soon as a car wheel depresses the beam 31 with which the switch is associated. Each switch 44a and 44b is of a conventional type and so arranged that it momentarily closes as the beam 31 with which it is associated moves down as it is depressed by the flange of a car wheel. It is apparent that each of switches 44a and 44b operates independently of the other so that momentary closure of either will reset the meter relay 67.

It is also apparent that when no car wheel is passing through the retarder both switches 43a and 43b are open. Relay 55 therefore cannot complete either circuit through the transducer, so the circuit cannot operate at zero frequency to actuate the solenoid 75 to open valve 51 and release the pistons 22. Switches 45a and 45b, which are open when no car wheel is passing through the retarder, also prevent undesired release of pistons 22. Pistons 22 therefore remain locked in their uppermost positions to hold the brakeshoe rails 10 and 11 in braking positions when there is no car wheel between the rails 10 and 11.

A normally open switch 76 is provided to connect the solenoid 75 directly across the 115 volt lines when the switch is closed. This switch is closed, either manually or by electrical or mechanical means, when it is desired to pass a car through the retarder in the reverse direction; closing of the switch energizes the solenoid 75 to open valve 51 and unlock the pistons 22 so the brakeshoe rails 10 and 11 cannot exert braking force.

The solenoid 75, and the switches and transducers associated with vibratory members 30a and 30b are connected by wires in conduits 77, 78 and 79 to the remaider of the conduit means in housing 80, as shown in FIGURE 1.

Figure 5:
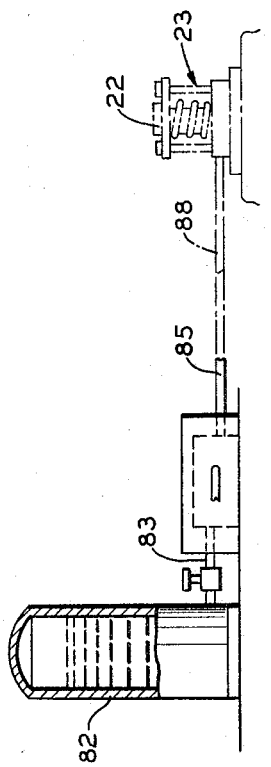
FIGURE 5 is a somewhat diagrammatic view showing the liquid reservoir and one of the brake actuating cylinders.

The fluid system, forming part of the control means 7, by which the pistons 22 of cylinders 23 are controlled by solenoid valve 51, is shown in FIGURES 1 and 5. The system comprises a suitable fluid reservoir tank 82 connected by pipe 83 to the solenoid controlled valve 51 and a check valve 84 permitting one-way flow of fluid away from the reservoir. The valves are in parallel. A main pipe 85 and branch pipes 86, 87 and 88 connect these valves to the cylinder units 23.

As apparent from FIGURE 2, etch illustrated cylinder unit 23 comprises an external hollow piston 22 that is slidably mounted in sealing relation on an upwardly extending portion 91 fixed to the base 92 of the cylinder unit. This portion has a central bore 93 opening into the space 94 inside piston 22 and above portion 91, and communicating with one of the pipes connected to the main pipe 85 leading to solenoid-controlled valve 51. A compression type spring 95 is located between base 92 and an outwardly extending radial flange 96 on the piston member 22 to bias the piston 22 upwardly to a position where it is limited against upward movement by nuts 97 on bolts 98 threaded into the base 92.

The system is filled with suitable hydraulic fluid, such as oil of a suitable viscosity, to a level in the reservoir sufficient to provide a substantial gravity head.

An actual example of a circuit of the type described above is one having the following components:

| Reference numeral: | Component |
|---|---|
| 40a, 40b | Vibration Transducers, Model EVS–2 Seismic Detector, Electro-Technical Labs. Div. of Mandrel Industries, Inc., Houston, Tex. |
| 43a, 43b | Single pole, spring return switches. |
| 44a, 44b | Momentary contact switches. |
| 45a, 45b | Single pole, spring return switches. |
| 55 | Bi-stable polarized relay — Potter Brumfield JMP. |
| 56, 63, 64 | Germanium diodes, 1N91. |
| 57 | 0.1 mfd. 150 v. capacitor. |
| 58 | 2200 ohm, ½ watt resistor. |
| 59 | Transistor 2N43A. |
| 60 | 1000 ohm, ½ watt resistor. |
| 61 | Zener diode, 5½ v. 1N762, 1N1520. |
| 62 | 0.5 mfd. 150 volt capacitor. |
| 65 | 5000 ohm potentiometer. |
| 66 | 30 mfd. 25 volt capacitor. |
| 67 | Meter relay, Weston Model 705. |
| 72 | Power relay with 6 v. D.C., 60 ma. coil. |
| 77 | Single pole switch. |

These components were used in a car retarder of the construction described above in which the distance D was 66 inches, the pitch distance between the centerlines of teeth 34 was 2 inches, the overall length of the brakeshoe rails was 19 feet, and the distance between the leading end of the brakeshoe rails and the first tooth 34 contacted by a car wheel entering the retarder was approximately 18 inches. The retarder was designed for a maximum entering speed of 15 miles per hour, and an actuating speed of 4 miles per hour.

The operation of the illustrated apparatus is as follows, assuming that the pistons 22 of cylinders 23 are all in their raised positions as shown in FIGURE 2, that the solenoid-controlled valve 51 is in the closed position so that the pistons are locked against downward movement, and that a car is approaching on the track in the direction shown by the arrows in FIGURES 1 and 4, at a speed above the actuating speed that will cause the car retarder to exert a braking force. This actuating speed is predetermined by the characteristics of the electrical system illustrated in FIGURE 4, which determines the predetermined voltage that will cause the solenoid valve to remain open if the voltage is not reached. The actuating speed may be adjusted within suitable limits by potentiometer 65, which adjusts the above mentioned predetermined voltage.

As the flange of the first wheel depresses beam 31 of vibratory member 30a, it actuates switches 43a, 44a and 45a which respectively complete a circuit through transducer 40a, open the meter relay switch 68 and connect solenoid 75 to the switch of relay 72, so the circuit means is ready to operate. Similar functions occur when switches 43b, 44b and 45b are actuated when beam 31 of member 30b is depressed by a wheel. Rolling contact of flanges of the wheels on the teeth 34 of beams 31 of vibratory members 30a and 30b will also cause the beams 31 to vibrate at a frequency proportional to the speed of the car wheels. These vibrations are transformed into electrical impulses, initially by transducer 40a and subsequently by transducer 40b, which electrical impulses are rectified and transformed into a direct current of a voltage proportional to the speed of the car as indicated previously. Since the car is above the actuating speed the voltage will be above the predetermined voltage so that the solenoid-controlled valve 51 is not opened and the pistons 22 are locked in their uppermost positions as shown in FIGURE 2. Consequently the braking mechanism 5 will exert on the car wheels between the brakeshoe rails 10 and 11 a braking force proportional to the weight of the car, which force as described above slows the car.

If, as should be the case, the car has entered the retarder at a speed below the maximum entering speed for which the retarder is designed and adjusted, the car will be slowed below the actuating speed before its wheels leave the brakeshoe rails 10 and 11; in such case the voltage to which the meter relay 67 is subjected falls below the predetermined voltage so that the meter relay controls the solenoid 75 to open the valve 51 as described above, so that liquid in the fluid system can flow to the reservoir 82 and the pistons 22 are no longer locked against downward movement by trapped liquid. This releases brakeshoe rails 10 and 11 and removes all the braking force exerted by them on the car wheels, except a negligible amount resulting from brake cylinder biasing springs 95, so that the car can then move out of the retarder at the desired speed to which it has been slowed below the actuating speed.

As a second example, if the conditions are the same as described above in the first example except that the car is traveling in the direction of the arrows at a speed below the actuating speed, the vibrations caused by the car wheels and the electrical pulses generated by the transducers 40a and 40b are such that the voltage to which the meter relay 67 is subjected is below the predetermined voltage and the solenoid controlled valve 75 will open, so that the cylinder units 23 communicate with the reservoir 82. The car wheels then merely move the brakeshoe rails 10 and 11 apart against the forces exerted by piston biasing springs 95 and the car travels through the retarder without being slowed.

In either of the above cases, as the last car wheel leaves the brakeshoe rails 10 and 11, they are urged toward their closest positions relative to each other, shown in full lines in FIGURE 2, by the springs 95 which raise the pistons 22 and the outer ends of lever members 13 and 14 to their uppermost positions. This is possible because valve 51 is open, permitting liquid to be drawn from the fluid system to fill the expanding spaces 94 inside the hollow pistons 22, the check valve 84 facilitating flow of liquid in this direction. The springs 95 are designed to exert upward forces sufficient to raise the pistons 22 to their uppermost positions against the weights of the outer ends of lever members 13 and 14 and the forces resulting from fluid flow and frictional resistances.

As the last car wheel leaves the beam 31 of the last vibratory member 30b, switch 45b opens; since switch 45a had previously opened, the circuit to solenoid 75 is open and valve 51 therefore can move to the closed position toward which it is biased. However, closing of the valve 51 should be delayed until the last wheel clears the brakeshoe rails 10 and 11 and the pistons 22 can move to their uppermost positions and draw liquid into their interiors as described in the preceding paragraph. The delay can be attained by providing a suitable switch 45b, solenoid 75, or valve 51, that provides the desired delayed action.

In the event a car enters a retarder at a speed substantially higher than the maximum entering speed for which the retarder was designed, the vibrations of beams 31 of sensor units 30a and 30b and the resulting electrical pulses emitted by transducers 40a and 40b will be at such a high frequency that the voltage to which the relay 67 is subjected will be high enough to prevent relay 67 from actuating the solenoid 75, so valve 51 will remain closed. Therefore, pistons 22 and the brakeshoe rails 10 and 11 will remain locked in braking positions during the entire time the car wheels are in the retarder.

Regardless of the positions in which the parts are left by a preceding car leaving the retarder, a succeeding car approaching the retarder will cause the retarder to operate. The first wheels contacting vibratory beams 31 in advance of the brakeshoe rails 10 and 11 will close switches 43a, 44a and 45a, and develop vibrations of a frequency proportional to the car speed; if the car speed is above the actuating speed the valve 51 will remain closed; if the speed is below the actuating speed the valve 51 will open. The pistons 22, the cylinder units 23 and the brakeshoe rails 10 and 11 will be accordingly controlled as described above.

It is apparent that the distance in advance of the brakeshoe rails that the car wheels first contact the teeth 34 of the sensor unit 30a should be selected so that at the maximum car entering speed for which the retarder is designed the time available for operation of the retarder to position the brakeshoe rails 10 and 11 in proper position will be sufficient to cause the desired results. The length of the brakeshoe rails 10 and 11 and the length of the speed sensing means 7 in its relation to the rails also affect the operation of the apparatus and the degree to which the car is slowed.

It is apparent that speed sensing means of the invention may be employed with other types of control means and braking mechanism than that illustrated. It is also to be understood that such speed sensing means, either with control means similar to that disclosed or other means, may be employed for purposes other than sensing speed of railroad cars for controlling a car retarder.

Those skilled in the art will also appreciate that various changes and modifications can be made in the disclosed embodiment of the invention without departing from the spirit and scope thereof.

The essential characteristics of the invention are described in the appended claims.

We claim:

1. In combination, a stretch of railway comprising a running rail, brakeshoe means associated with a running rail and operable to be maintained in and released from braking relation to said running rail in which relation said brakeshoe means can exert braking force on a wheel rolling on said running rail, vibratory means adjacent a running rail adapted to be engaged by a wheel rolling on said rail for producing physical vibrations independently of said rail of a frequency substantially proportional to the speed of said wheel rolling on said running rail, and means controlled by the frequency of said vibrations for maintaining said brakeshoe means in said braking relation when the wheel is traveling faster than a predetermined speed and for releasing said brakeshoe means when the wheel is traveling slower than said predetermined speed.

2. In combination, a stretch of railway comprising a running rail, brakeshoe means associated with a running rail and operable to be maintained in and released from braking relation to said running rail in which relation said brakeshoe means can exert on a wheel rolling on said running rail braking force substantially proportional to the downward force exerted by the wheel on said running rail and resulting from the weight carried by said wheel, vibratory means adjacent a running rail adapted to be engaged by a wheel rolling on said rail for producing physical vibrations independently of said rail of a frequency substantially proportional to the speed of said wheel rolling on said running rail, and means controlled by the frequency of said vibrations for maintaining said brakeshoe means in said braking relation when the wheel is traveling faster than a predetermined speed and for releasing said brakeshoe means when the wheel is traveling slower than said predetermined speed.

3. The combination of claim 1 in which said running rail adjacent which said vibratory means is located is adapted to have a flanged wheel roll thereon, and in which said vibratory means is adapted to be engaged by the flange of said flanged wheel.

4. The combination of claim 2 in which said running rail adjacent which said vibratory means is located is adapted to have a flanged wheel roll thereon, and in which said vibratory means is adapted to be engaged by the flange of said flanged wheel.

5. In combination, a stretch of railway comprising a running rail, brakeshoe means associated with a running rail and operable to be maintained in and released from braking relation to said running rail in which relation said brakeshoe means can exert braking force on a wheel rolling on said running rail, vibratory means adjacent a running rail adapted to be engaged by a wheel rolling on said rail for producing physical vibrations independently of said rail of a frequency substantially proportional to the speed of said wheel rolling on said running rail, means for translating said physical vibrations into an electric current of a characteristic of a value substantially proportional to the frequency of said vibrations, and means controlled by said electrical characteristic value for maintaining said brakeshoe means in said braking relation when the wheel is traveling faster than a predetermined speed and for releasing said brakeshoe means when the wheel is traveling slower than said predetermined speed.

6. In combination, a stretch of railway comprising a running rail, brakeshoe means associated with a running rail and operable to be maintained in and released from braking relation to said running rail in which relation said brakeshoe means can exert braking force on a wheel rolling on said running rail, vibratory means adjacent a running rail adapted to be engaged by a wheel rolling on said rail for producing physical vibrations independently of said rail of a frequency substantially proportional to the speed of said wheel rolling on said running rail, means for translating said physical vibrations into an electrical current of a voltage substantially proportional to the frequency of said vibrations, and means controlled by said voltage for maintaining said brakeshoe means in braking relation when the wheel is traveling faster than a predetermined speed and for releasing said brakeshoe means when the wheel is traveling slower than said predetermined speed.

7. A car retarder comprising a running rail, brakeshoe means associated with said running rail, a lever connected to said brakeshoe means, said lever being disposed transversely to said running rail and being supported at a bearing portion of said lever spaced transversely from said running rail, means movably bearing against said bearing portion of said lever, said means being movable from a released position in which it releases said lever bearing portion so said brakeshoe means cannot exert an appreciable braking force to a braking position in which it bears against said lever bearing portion so said brakeshoe means can exert a braking force on a wheel on said running rail associated with said brakeshoe means, means biasing said movable supporting means toward said braking position, vibratory means associated with a running rail and adapted to be engaged by a wheel rolling on said running rail and vibrated independently of said rail at a frequency substantially proportional to the speed of travel of said wheel, and means controlled by the frequency of said vibrations for maintaining said movable supporting means in a position in which is bears against said lever bearing portion so said brakeshoe means exerts a braking force on a wheel on the running rail associated with said brakeshoe means when a wheel travels on the rail associated with said vibratory means at a speed above a predetermined speed, and for releasing said movable supporting means so said brakeshoe means can exert no appreciable braking force when a wheel traveling on the running rail associated with said vibratory member travels at a speed below said predetermined speed.

8. A car retarder comprising a running rail, brakeshoe means associated with a running rail, a lever connected to said brakeshoe means, said lever being disposed transversely to said running rail and being supported at a bearing portion of said lever spaced transversely from said running rail, movable means supporting said bearing portion of said lever, said means being movable between raised and lowered positions, vibratory means associated with a running rail and adapted to be engaged by a wheel rolling on said running rail and vibrated independently of said rail at a frequency substantially proportional to the speed of travel of said wheel, and means controlled by the frequency of said vibrations for maintaining said movable supporting means in a raised position in which it supports said bearing portion of said lever so said brakeshoe means exerts a braking force on a wheel on the running rail associated with said brakeshoe means when a wheel travels on the rail associated with said vibratory means at a speed above a predetermined speed, and for releasing said movable supporting means so said brakeshoe means can exert no appreciable braking force when a wheel traveling on the running rail associated with said vibratory member travels at a speed below said predetermined speed.

9. A car retarder comprising a running rail, brakeshoe means associated with said running rail, a lever connected to said brakeshoe means, said lever being disposed transversely to said running rail and having a bearing portion of said lever spaced transversely from said running rail, means movably bearing against said bearing portion of said lever, said means being movable between released position in which it releases said lever bearing portion so said brakeshoe means can not exert appreciable braking force to braking position in which it bears against said lever bearing portion so said brakeshoe means can exert braking force on a wheel on said running rail associated with said brakeshoe means, means biasing said movable supporting means toward said braking position, means for releasably locking said movable means against movement in the direction away from braking position, vibratory means associated with a running rail and adapted to be engaged by a wheel rolling on said running rail and vibrated independently of said rail at a frequency substantially proportional to the speed of travel of said wheel, means for converting said vibrations into an electrical signal having a characteristic substantially proportional to the frequency of said vibrations, and means utilizing said signal for controlling said locking means so it locks said movable supporting means in braking position when said vibrations are above a predetermined frequency and releasing said movable supporting means when said vibrations are below a predetermined frequency.

10. Speed sensing apparatus comprising a rail adapted to have a rotatable member move relative to said rail in rolling engagement therewith, vibratory sensor means disposed adjacent said rail so it can be contacted by a rotatable member moving relatively to and along said rail, means for resiliently supporting said sensor means so it can vibrate relatively to and independently of said rail, means operating between said rotatable member and said sensor means to cause said sensor means to vibrate as the rotatable member moves relatively to said rail at a frequency substantially proportional to the rate of relative movement between said rotatable member and said rail, and means controlled by the frequency of said vibrations.

11. Speed sensing apparatus comprising a rail adapted to have a wheel roll therealong, an elongated vibratory sensor member disposed adjacent said rail so it can be contacted by said wheel rolling along said rail, means for resiliently supporting said sensor member so it can vibrate relatively to and independently of said rail, and dentate means operating between said sensor member and a wheel rolling along said rail to cause said sensor member to vibrate as the wheel rolls along said rail at a frequency proportional to the speed of travel on said rail.

12. Speed sensing apparatus comprising a rail adapted to have a wheel roll therealong, an elongated rigid vibratory sensor member disposed along a rail, said member having a plurality of equally spaced teeth adapted to be contacted by a circular edge of a wheel rolling along the rail, and means for resiliently mounting said elongated member so it is biased upwardly but can be moved downwardly independently of said rail by contact of the wheel with each of said teeth on said member, the spacing between said teeth and the supporting means for said member being such that said member vibrates substantially vertically independently of said rail as its teeth are engaged by the edge of a wheel rolling along said rail, the frequency of said vibrations being substantially proportional to the speed of travel of the wheel on the rail.

13. Speed sensing apparatus comprising a rail member adapted to have a rotatable member move relative to said rail in rolling engagement therewith, vibratory sensor means disposed adjacent said rail member so it can be contacted by a rotatable member moving relatively to and along said rail member, means for resiliently supporting said sensor means so it can vibrate relative to and independently of said rail member, means operating between said rotatable member and said sensor means to cause said sensor means to vibrate as the rotatable member moves relatively to said rail member at a frequency substantially proportional to the rate of relative movement between said rotatable member and said rail member, and means for converting said vibrations to an electrical signal having a characteristic related to the frequency of said vibrations; and means actuated by said electrical signal.

14. Speed sensing apparatus comprising a rail adapted to have a wheel roll therealong, an elongated rigid vibratory sensor member disposed along a rail, said member having a plurality of equally spaced teeth adapted to be contacted by a circular edge of a wheel rolling along the rail, means for resiliently mounting said elongated member so it is biased upwardly but can be moved downwardly independently of said rail by contact of the wheel with each of said teeth on said member, the spacing between said teeth and the supporting means for said member being such that said member vibrates substantially vertically independently of said rail as its teeth are engaged by the edge of a wheel rolling along said rail, the frequency of said vibrations being substantially proportional to the speed of travel of the wheel on the rail, means for converting said vibrations to an electrical signal having a characteristic related to the frequency of said vibrations, and means actuated by said electrical signal.

15. Speed sensing apparatus comprising a supporting member adapted to have a wheel rolled therealong, two vibratory members each of which is adapted to vibrate independently of the other and of said supporting member when contacted by a wheel rolling on said supporting member at a frequency substantially proportional to the speed being sensed, means for converting the vibrations of each of said members into electrical pulses of a frequency substantially proportional to said vibrations, electrical circuit means for converting such electrical pulses into an electrical signal having a characteristic of a value substantially proportional to the frequency of such pulses, means for selectively connecting each of said vibration converting means to said circuit means, and means actuated by said electrical signal of said circuit means to operate in accordance with the magnitude of said value of said characteristic.

16. Speed sensing apparatus comprising a supporting member adapted to have a wheel rolled therealong, two vibratory members each of which is adapted to vibrate independently of the other and of said supporting member when contacted by a wheel rolling on said supporting member at a frequency substantially proportional to the speed being sensed, means for converting the vibrations of each of said members into electrical pulses of a frequency substantially proportional to said vibrations, electrical circuit means for converting such electrical pulses into a direct current of a voltage substantially proportional to the frequency of such pulses, means for selectively connecting each of said vibration converting means to said circuit means, and means actuated by said direct current of said circuit means to operate in accordance with the magnitude of said voltage.

17. A car retarder comprising a pair of running rails; brakeshoe means associated with the first of said running rails; a lever connected to said brakeshoe means, said lever being disposed transversely of said running rails and having a bearing portion spaced from said first running rail; means movably bearing against said bearing portion of said lever, said means being movable from release position in which it releases said lever bearing portion so said brakeshoe means cannot exert appreciable braking force to braking position in which it bears against said lever bearing portion so said brakeshoe means can exert braking force on a wheel on said first running rail; means biasing said movable supporting means toward said braking position; means for releasably locking said movable supporting means against movement in the direction away from braking position; speed sensing means comprising a vibratory member located adjacent the second of said running rails so said member can be caused to vibrate independently of said second rail by a wheel on said second rail at a frequency substantially proportional to the speed of the wheel; means for converting the vibrations of said member into electrical pulses of a frequency proportional to said vibrations; electrical circuit means for converting such electrical pulses into an electrical signal having a characteristic of a value substantially proportional to the frequency of such pulses; and means operating in accordance with the magnitude of said value of said characteristic of said electrical signal to control said locking means so that when a wheel on said second running rail is traveling at a speed above a predetermined speed said locking means is caused to lock said movable supporting means in braking position and when said wheel is traveling at a speed below said predetermined speed said locking means is released so said movable supporting means is released and said brakeshoe means cannot exert appreciable braking force.

18. A car retarder comprising a pair of running rails; brakeshoe means associated with the first of said running rails; a lever connected to said brakeshoe means, said lever being disposed transversely of said running rails and having a bearing portion spaced from said first running rail; means movably bearing against said bearing portion of said lever, said means being movable from release position in which it releases said lever bearing portion so said brakeshoe means cannot exert appreciable braking force to braking position in which it bears against said lever bearing portion so said brakeshoe means can exert braking force on a wheel on said first running rail; means biasing said movable supporting means toward said braking position; means for releasably locking said movable supporting means against movement in the direction away from braking position; speed sensing means comprising two vibratory members located adjacent the second of said running rails so each of said members can be caused to vibrate independently of the other of said members and said second rail by a wheel on said second rail at a frequency substantially proportional to the speed of the wheel; means for converting the vibrations of each of said members into electrical pulses of a frequency proportional to said vibrations; electrical circuit means for converting such electrical pulses into an electrical signal having a characteristic of a value substantially proportional to the frequency of such pulses; means for selectively connecting each of said vibration converting means to said circuit means; and means operating in accordance with the magnitude of said value of said characteristic of said electrical signal to control said locking means so that when a wheel on said second running rail is traveling at a speed above a predetermined speed said locking means is caused to lock said movable supporting means in braking position and when said wheel is traveling at a speed below said predetermined speed said locking means is released so said movable supporting means is released and said brakeshoe means cannot exert appreciable braking force.

19. A car retarder comprising a pair of running rails; a lever associated to said brakeshoe means, said lever being disposed transversely of said running rails and having a bearing portion spaced from said first running rail; means movably bearing against said bearing portion of said lever, said means being movable from release position in which it releases said lever bearing portion so said brakeshoe means cannot exert appreciable braking force to braking position in which it bears against said lever bearing portion so said brakeshoe means can exert braking force on a wheel on said first running rail; means biasing said movable supporting means toward said braking position; means for releasably locking said movable supporting means against movement in the direction away from braking position; speed sensing means comprising a vibratory member located adjacent the second of said running rails so said member can be caused to vibrate independently of said second rail by a wheel on said second rail at a frequency substantially proportional to the speed of the wheel; means for converting the vibrations of said member into electrical pulses of a frequency proportional to said vibrations; electrical circuit means for converting such electrical pulses into a direct current of a voltage substantially proportional to the frequency of such pulses; and means operating in accordance with the magnitude of the voltage of said current to control said locking means so that when a wheel on said second running rail is traveling at a speed that results in a voltage above a predetermined voltage said locking means is caused to lock said movable supporting means in braking position and when said wheel is traveling at a speed that results in a voltage below said predetermined voltage said locking means is released so said movable supporting means is released and said brakeshoe means can not exert appreciable braking force.

20. In combination, a strip of railway comprising a running rail, brake shoe means associated with a running rail and operable to be maintained in and released from braking relation to said running rail in which relation said brake shoe means can exert a braking force on a wheel rolling on said running rail, means associated with a running rail for producing physical vibrations independently of said rail of a frequency substantially proportional to the speed of said wheel rolling on said running rail, means for converting said vibrations into electrical pulses of a frequency substantially proportional to said vibrations, electrical circuit means for converting such electrical pulses into an electrical signal having a characteristic of a value substantially proportional to the frequency of said pulses, and means controlled by said electrical characteristic value for maintaining said brake shoe means in said braking relation when the wheel in traveling faster than a predetermined speed and for releasing said brake shoe means when the wheel is traveling slower than said predetermined speed.

21. The apparatus of claim 20 in which said electrical circuit means converts such electrical pulses into direct current of a voltage substantially proportional to the frequency of such pulses, and in which said means controlled by said electrical characteristic value is controlled by said voltage.

References Cited
UNITED STATES PATENTS

| | | | |
|---|---|---|---|
| 1,864,361 | 6/1932 | Livingston | 188—62 X |
| 1,876,013 | 9/1932 | Livingston | 188—62 X |
| 2,129,301 | 9/1938 | Bone | 188—62 |
| 3,200,245 | 8/1965 | Brown | 188—62 X |
| 3,237,007 | 2/1966 | Crawford | 246—182 |
| 3,240,930 | 3/1966 | Porter et al. | 246—182 |

DUANE A. REGER, *Primary Examiner.*